United States Patent [19]

Scott

[11] Patent Number: 5,299,764
[45] Date of Patent: Apr. 5, 1994

[54] IN-SPACE SERVICING OF SPACECRAFT EMPLOYING ARTIFICIAL LIFE ROBOTICS

[76] Inventor: David R. Scott, 1300-B Manhattan Ave., Manhattan Beach, Calif. 90266

[21] Appl. No.: 79,707

[22] Filed: Jun. 18, 1993

Related U.S. Application Data

[63] Continuation of Ser. No. 981,417, Oct. 23, 1991, abandoned.

[51] Int. Cl.$^5$ .............................................. B64G 1/10
[52] U.S. Cl. .................................... 244/159; 244/161
[58] Field of Search ..................... 244/158 R, 159, 161

[56] References Cited

U.S. PATENT DOCUMENTS

| | | | |
|---|---|---|---|
| 3,401,903 | 9/1968 | Bohr | 244/161 |
| 4,043,524 | 8/1977 | Dreyer et al. | 244/158 R |
| 4,964,596 | 10/1990 | Ganssle et al. | 244/161 |
| 5,109,345 | 4/1992 | Dabney et al. | 244/161 |

FOREIGN PATENT DOCUMENTS

0024073  1/1990  Japan ................................ 244/161

OTHER PUBLICATIONS

"Survey of Remote Handling in Space", AMRL-TDR-62-100, Sep. 1962, see p. 20.
Runge, "Space Tug/Spacecraft/Module Exchange", Mechanism and Machine Theory, 1977, pp. 451-462, vol. 5.
Fernandez, "Computer Control of Robotic Satellite Servicer", No. 5, Conference: Proceedings of Southeastern '8s, Apr. 1980, IEEE.
Stern, "Some Thoughts on Unmanned Lunar Exploration", NASA TN X 55806, 1967, Jun.
Sved, "Assembly and Maintenance of Space Platforms", JBIS, Jul. 1985, pp. 319-326.

Primary Examiner—Galen L. Barefoot
Attorney, Agent, or Firm—William H. Drummond

[57] ABSTRACT

Artificial life robotics are utilized in a system for in-space service of spacecraft. An Earth Launch Vehicle (ELV) carries an Exoatmospheric Mothership Vehicle (MSV) into a space trajectory. The MSV, in turn, carries at least one Operational Service Vehicle (OSV). The MSV separates from the ELV and rendezvous within station keeping proximity of the spacecraft. The OSV then separates from the MSV for operative approach to the spacecraft. The OSV includes a propulsion/attitude control system and spacecraft servicing apparatus. The OSV carries an on-board "artificial life" computer which controls the OSV propulsion system and spacecraft servicing apparatus.

1 Claim, 7 Drawing Sheets

IN-SPACE SERVICING OF SPACECRAFT EMPLOYING ARTIFICIAL LIFE ROBOTICS

This is a continuation of copending application Ser. No. 07/981,417 filed on Oct. 23, 1993 now abandoned.

This invention relates to a system for carrying out in-space services such as inspection, repair, modification, refueling, salvage or recommissioning of a spacecraft.

In another respect the invention concerns end-use applications of so-called "artificial life" robotic technology.

In still another and more specific respect, the invention relates to the application of artificial life robotic technology and subminiturization of electrical and mechanical components to improve current systems and methods for in-space servicing of spacecraft or to provide for servicing of spacecraft which cannot be otherwise effected by conventional systems and methods.

In the past here have been several instances where satellites have failed to operate or have had operational capabilities significantly reduced because of relatively minor mechanical malfunctions which could be straightforwardly resolved if the spacecraft could be accessed. Other satellites which are otherwise serviceable could be recommissioned by refueling their propulsion and/or attitude control systems or by other relatively simple expedients.

For example, the NASA Galileo/Jupiter spacecraft has an 18 foot antenna which must be deployed for mission success. This antenna has failed to deploy, apparently because it was not lubricated between the originally projected launch date in 1986 and its actual launch date in 1990. It is believed that application of a small assisting force of only about two pounds properly applied to the Galileo antenna elements would cause them to deploy. Since the cost of Galileo is over $1 billion, re-commissioning or salvaging it would make a major contribution, to not only the Galileo program, but also the future of satellite planning, design and operations in general.

It would be highly desirable therefore, to provide systems and methods for in-space servicing of spacecraft such as orbiting satellites, space probes and the like. It would also be highly desirable to provide for such operations, systems and methods which are of reduced cost and complexity and which employ proven existing hardware components which, because of their small size and low mass, can be more readily placed within operational proximity of an ailing spacecraft.

With such small size and low mass, multiple small repair or service vehicles can be placed in operational proximity to a disabled spacecraft to work and/or navigate cooperatively. Also the small size/low mass service vehicles can be launched from earth at reduced cost, either multiple service vehicle per earth launch vehicle or as the smaller, less expensive earth launch vehicle.

Therefore, a principal object of the present invention is to provide improved systems and methods for in-space servicing of spacecraft.

Another principal object of the invention is to provide new applications of existing artificial life robotic technology and subminiaturization technology.

Yet another object of the invention is to provide such in-space service systems which can operate substantially autonomously, to reduce the dependence of such systems on communications links with other facilities.

Still another object of the invention is to provide in-space service/repair systems with enhanced visualization capabilities.

A further object of the invention is to provide in-space service systems and methods which provide multiple small service vehicles capable of cooperative navigation guidance and control.

These and other, further and more specific objects and advantages of the invention will be apparent those skilled in the art from the following detailed description thereof, taken in conjunction with the drawings, in which.

Figure 1:
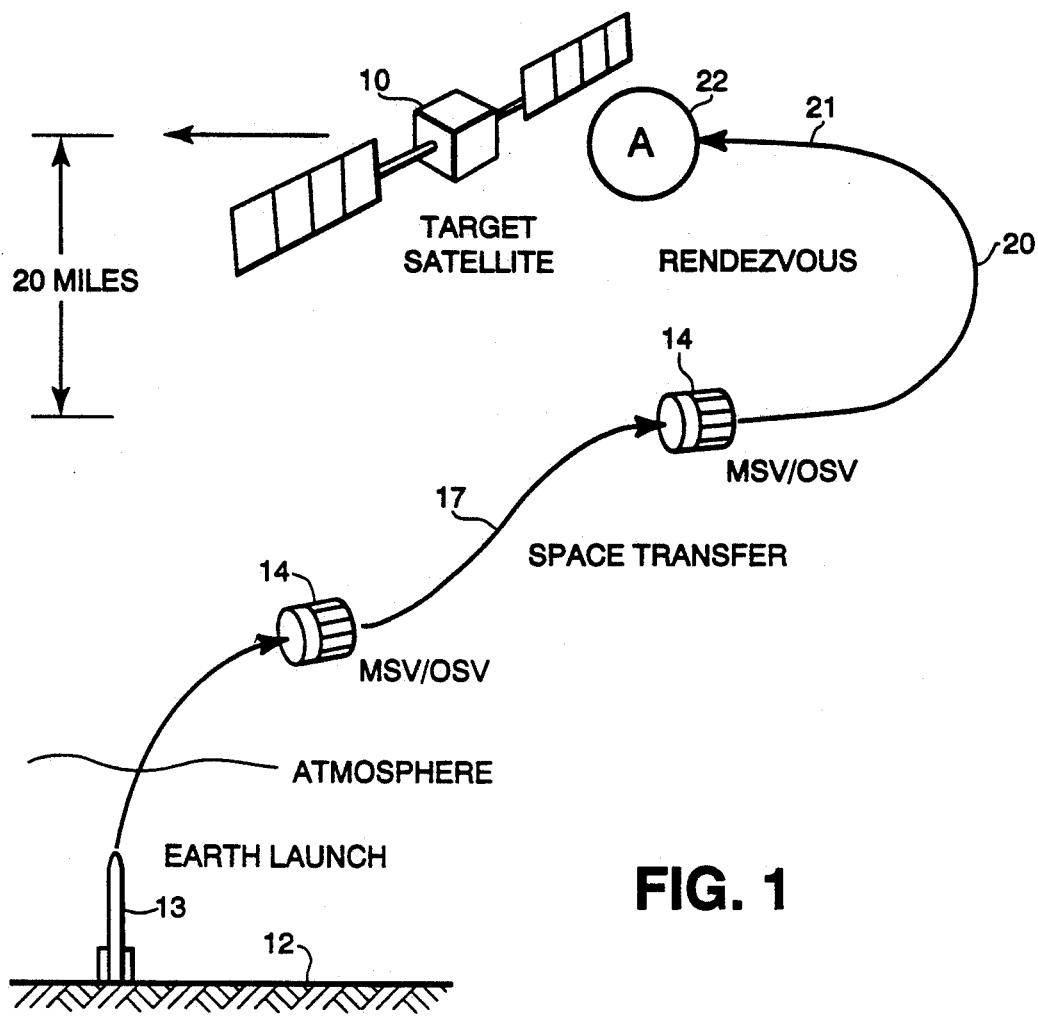
FIGS. 1 and 2 illustrate a typical mission scenario utilizing the systems and methods of the present invention to service a satellite in earth orbit.

Briefly, in accordance with the invention, I provide a system for in-space service of a spacecraft. The system includes an Earth Launch Vehicle (ELV), an exoatmospheric Mothership Vehicle (MSV) and at least one Operational Service Vehicle (OSV). The MSV is adapted to be carried in a first space trajectory by the ELV, separate from the ELV and transit to a second space trajectory. The OSV is adapted to be carried into the second space trajectory by the MSV, separate from the MSV, and operatively approach the spacecraft. Each OSV includes propulsion means, spacecraft servicing means and artificial life computer means for controlling its propulsion means and servicing means.

In accordance with another aspect of the invention, I provide an operational service vehicle including propulsion means which comprises a liquid-fueled main propulsion rocket engine capable of multiple starts, variable thrust burns and braking maneuvers complementary attitude control thrusters for pitch, yaw and roll control. The OSV also includes spacecraft servicing elements including one or more television cameras, illumination system, infra-red sensors, radar direction and ranging systems, robotic arms, grippers, clamps, scoops, fuel delivery systems, battery recharging systems, spacecraft component transport/installation systems, and the like. An artificial life computer controls the propulsion means and spacecraft servicing means. In a preferred embodiment the operational service vehicle is also configured for teleoperation and includes means for communicating with manned spacecraft or ground control stations, for example, via communications links which may include relay by the mothership vehicle.

Also, in accordance with the broadest aspect of the invention, end-use applications of artificial life technology are provided in which autonomous behavior-controlled and/or teleoperated robotic apparatus is employed perform a variety of useful tasks which formerly required human decision/control/manipulation activities. Such autonomous control enables operations to be carried out which may be hampered or prevented by time-lag-effects.

As used herein the term "service" of a spacecraft which includes any one or more of a variety of operations which involve interaction of the OSV and a spacecraft such as inspection, repair, modification, salvage or recommissioning the spacecraft, including refueling, addition/replacement of spacecraft components or systems, decommissioning, repositioning, reorientation and the like. The term "spacecraft" includes man-made satellites, space probes and other manned and unmanned space vehicles and the like. "In-space" means that the spacecraft servicing operations are carried out at locations outside the earth's sensible atmosphere. The trajectory of the spacecraft may be an orbital trajectory around the earth or an extraterrestrial body and may include planetary transfer trajectories and outer space destination trajectories.

The term "earth launch vehicle" or "ELV" means a rocket which is capable of delivering a payload to a ballistic space trajectory or to low earth orbit ("LEO"). Such ELVs are constructed to withstand dynamic atmospheric effects such as wind, rain, turbulence, ice, shear and lightening, and the pressure and thermal effects of atmospheric drag during earth ascent. ELVs include rocket systems which may consist of two or more "stages", each of which is dropped during the ascent phase of the launch sequence when its propellant is expended, thus reducing the dead weight of the vehicle. These stages may be mounted in tandem or "strapped-on" the outside of the core first stage. Most ELVs presently used commercially are either duplicates or derivatives of Intercontinental Ballistic Missiles (ICBMS) developed during the 1950's and 1960's and which were designed to deliver a payload to a ballistic space trajectory or to LEO.

The term "mothership vehicle" or "MSV" means a rocket vehicle, typically including a main engine, attitude control, guidance and communications systems, fuel supplies, etc., usually constructed as an exoatmospheric vehicle because it is only subjected to relatively static conditions in space, such as radiation from the sun and bombardment by my particulate matter. Such MSVs are adapted to carry payloads from LEO to other space trajectories, including transplanetary trajectories and planetary orbit insertion and may be configured for planetary descent and ascent operations. Typical MSVs include suitably modified Viking Orbiters, Peacekeeper Stage IVs, and the Space Transfer Vehicles disclosed in U.S. Pat. Nos. 4,896,848 and 4,664,343. The modifications necessary to such vehicles are well known in the art and include rendezvous capability systems, communications relay system, navigation beacon systems, hanger/dispenser systems and on-board power systems for such components.

According to one embodiment of the invention, the ELV-MSV components of the in-space service system are based on those disclosed in pending USA application Ser. No. 472,395, filed Jan. 30, 1990 entitled "Space Transfer Vehicle and Integrated Guidance Launch System". According to another preferred embodiment of the invention in which the system is optimized for a proposed Galileo repair mission, the MSV is based on the Peacekeeper Stage IV.

Figure 2:
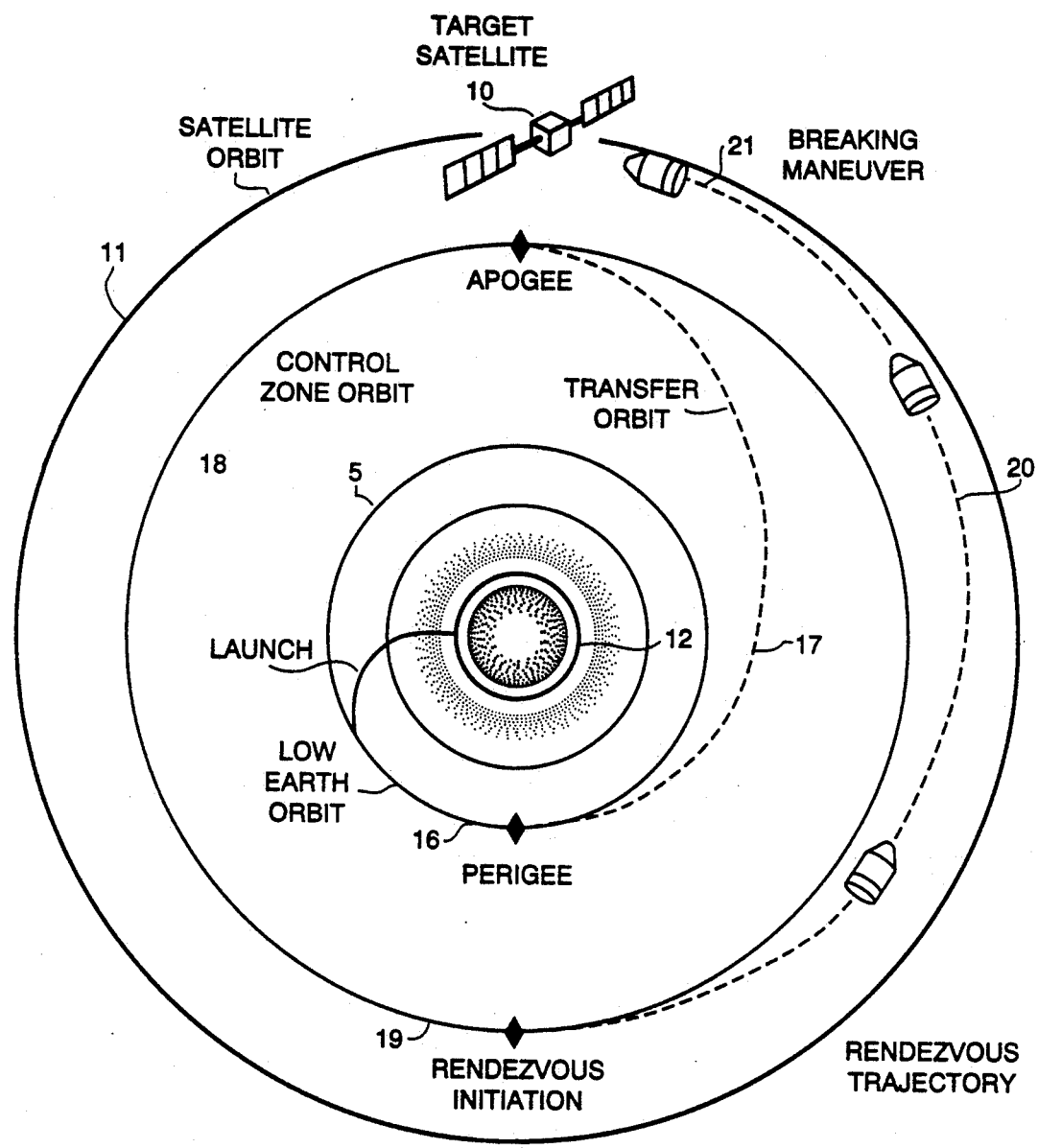

Turning now to the drawings in which the presently preferred embodiments are depicted and the practice of the invention is depicted for purposes of illustration and not by way of limitation of the scope of the ivnention, FIGS. 1-2 depict a typical mission scenario involving service of a target satellite 10 in an orbit 11 around the earth 12. The ELV 13 carries the MSV/OSV payload 14 in to LEO 15. In the preferred embodiment the MSV carries a plurality of OSVs. After separation of the MSV/OSV from the ELV, an MSV/perigee burn 16 carries the MSV/OSV combination through transfer orbit 17 in the control zone orbit 18. A further MSV/perigee burn 19 carries the MSV/OSV into rendezvous trajectory 20. The MSV then carries out a braking manoeuver 21 to place the MSV/OSV combination in station keeping distance 22 of the spacecraft 10. Station keeping distance proximity is approximately 100–500 feet, a distance at which orbital mechanics effects are not significant and in which the OSVs can compensate with their own propulsion systems for operational approach to the spacecraft and, if desired, for return to the MSV. The MSV can remain in station keeping distance A22 without significant use of MSV propellant, but the MSV is far enough away to preclude contamination to the spacecraft 10 by the MSV thrusters.

Figure 3:
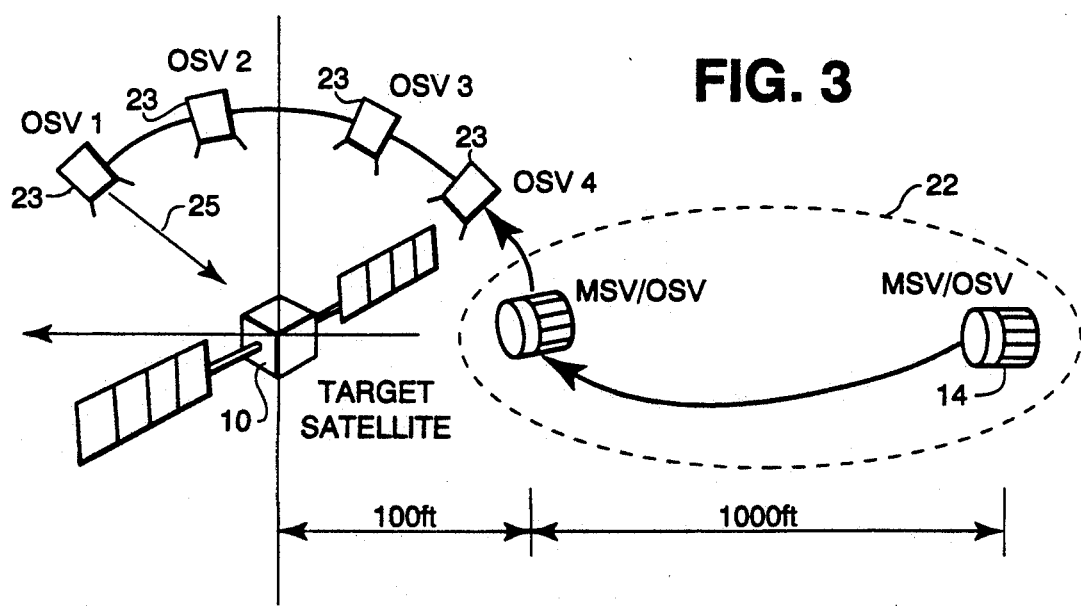
FIG. 3 is a relative motion plot showing proximity operations of the mothership vehicle and operational service vehicles which are employed in the practice of the invention.

As depicted in FIG. 3 after arrival of the MSV/OSV in the station keeping zone 22, each of the plurality of OSV's 23 are separated from the MSV for approach 25 to proximity of the spacecraft 10, i.e., less than 100 feet.

Figure 4:
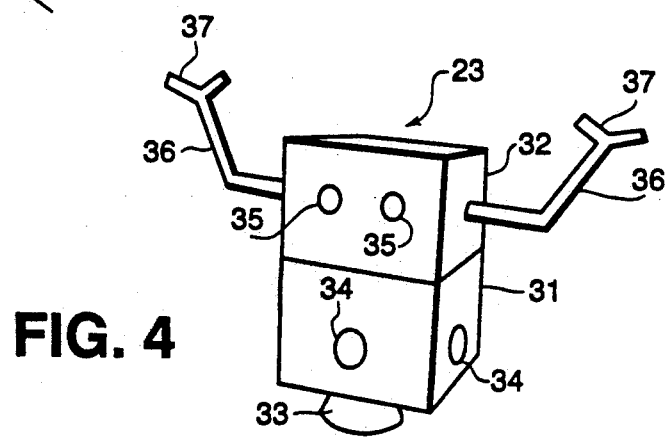
FIG. 4 is a perspective view of an operational service vehicle used in the practice of the invention.

A typical OSV as depicted in FIG. 4 consists of the combination of a service module 31 and a "smart" or command module 32. The service module 31 includes a liquid fueled main propulsion rocket engine 33 and attitude control thruster rockets 34. The command module 32 includes target location/tracking/inspection sensors 35 and various electromechanical service components such as robotic arms 36 carrying clamps or grippers 37.

The OSV of FIG. 4 includes an artificial life computer which receives inputs from various remote sensing components, tactile sensors, etc. and controls the main propulsion engine 33 and thrusters 34 of the service module 31 and the repair components 36 of the smart module 32.

Figure 5:
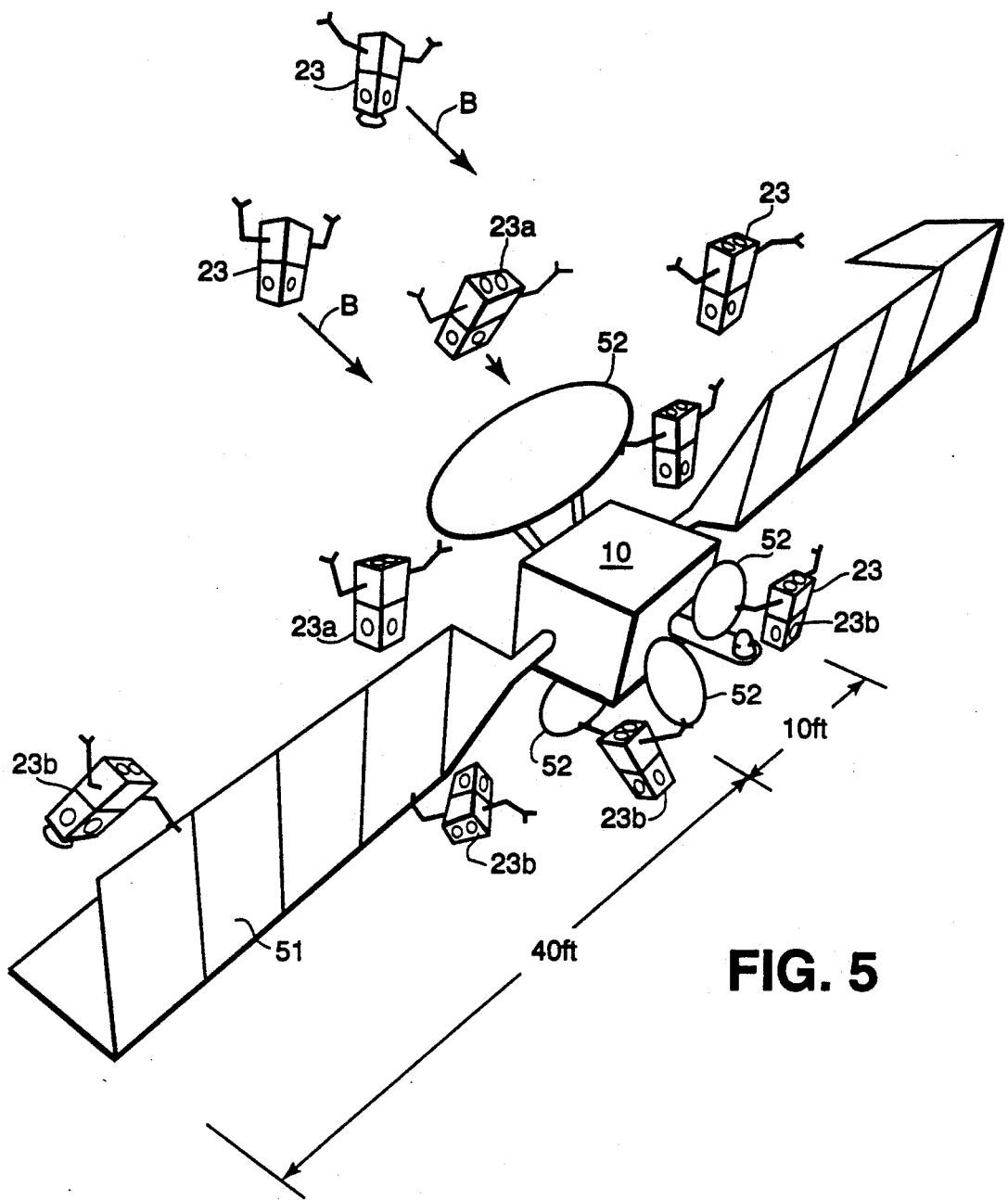
FIG. 5 depicts typical satellite service operations by a plurality of operational service vehicles in accordance with a preferred embodiment of the invention.

Service operations performed on the spacecraft 10 by the OSV's 23 are illustrated in FIG. 5. Each of the OSV's 23 is independently propelled by its propulsion system from station keeping proximity (FIG. 3, reference numeral 22) to proximity locus of the spacecraft 10 as indicated by the arrows B. Each of the OSV's 23 then independently carries out various spacecraft servicing operations. For example, OSV 23a may perform inspection by means of T.V. cameras, relaying the T.V. signals via the MSV to ground or manned spacecraft control centers. OSV's 23b may independently or cooperatively and, under optional teleoperation, perform tasks such as extending solar power array panels 51 or reorienting communication link antennas 52.

The Operational Service Vehicle (OSV) is essentially a combination of two known subsystems, a propulsion system and artificial life (AL) robotics, to provide a highly maneuverable platform for the various service components previously described, using autonomous behavior control robotics to perform all or part of both navigation and spacecraft service functions. The propulsion sub system is exemplified by the so-called "LEAP" vehicle and derivatives and modifications thereof, such as those disclosed in the article by James R. Asker appearing in "Aviation Week & Space Technology", pages 61 et seq (Feb. 26, 1990), which have been developed by several aerospace hardware manufacturers such as Rockwell, Martin-Marietta, Boeing-/Rockwell and Hughes. Appropriate modifications of such LEAP vehicles are made to enable the entire vehicle to be maneuvered for the trajectory of interest, rendezvous, station keeping or the like by adding and-/or relocating attitude control thrusters and, if necessary, by redirecting the main axial or "divert" thrusters. Propellant/pressurant tanks are appropriately sized to enable the vehicle to carry the service components payload and AL robotic components.

The navigation command/control of the propulsion system and the spacecraft aservicing components is implemented by AL robotics technology as described in the paper entitled "Mini Rovers for Mars Exploration", proceedings of the VISION-21 Symposium, Cleveland, Ohio, (April, 1990). and the papers cited therein. See also the Smithsonian Magazine, (June, 1991), pages 65-73. This autonomous behavior-controlled robotic technology utilizes microprocessors combined with a robust set of environment sensors which are organized around coherent behaviors such as "avoid obstacles", "explore" and the like. Each behavior, in turn, is programmed as a kind of reflex, a direct link between perception and action. These low level behaviors enable the OSV's to plan and execute specific autonomous or teleoperational missions in the form of high-level actions rather than primitive step-by-step commands.

FIGS. 6-10 illustrate apparatus which has been devised for repairing the NASA Galileo spacecraft. On Dec. 8, 1992, this spacecraft will pass within 188 nautical miles of earth on its second gravity assist flyby to Jupiter where it is expected to arrive three years later for extensive scientific observations. Unless Galileo's high gain antenna (HGA) can be deployed, the primary objectives of the missions will be almost a total failure. The normal transmission rate from the HGA is 134 Kbits/second which will provide a nominal 40-second transmission time for a 5 million bit image. Although the Galileo has a low gain antenna, the transmission rate from it is only 10 bits/second which would require a 10-day transmission time for such images. As a result, almost all of the imaging of Jupiter and its moons will be lost.

Figure 6:
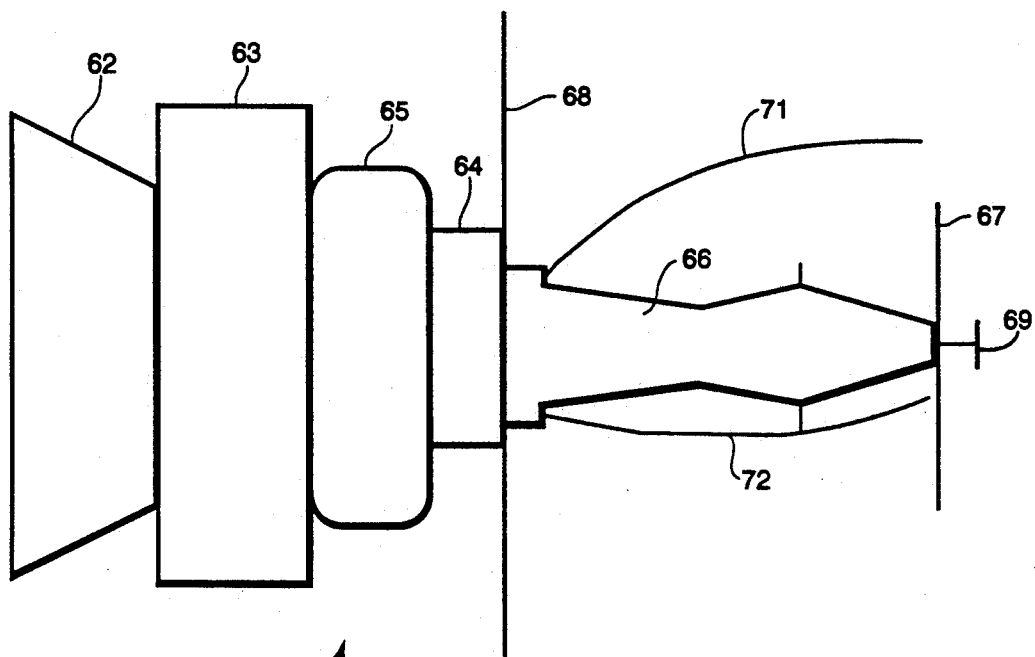
FIG. 6 depicts for illustrative purposes the current state of antenna deployment of the Galileo spacecraft.

Several attempts to deploy the Galileo antenna by normal and backup procedures have been unsuccessful. Extensive testing and analytical modeling has defined the most likely problem as three ribs of the umbrella-like metal mesh antenna structure being stuck in the stowed position, while the remaining ribs have been deployed. This condition is illustrated in FIG. 6 which shows the Galileo spacecraft 61, consisting of an unspun section, including the propulsion motor 62, tankage 63, avionics/navigation/control system 64 and operational equipment 65, including communications, imagery and other sensor systems. The spacecraft 61 also includes an antenna tower 66 carrying a forward sunscreen 67, a rear sunscreen 68 and the low gain antenna 69. Certain of the ribs 71 of the high gain antenna structure have been deployed as shown while other ribs 72 remain stuck in the stowed position. The antenna tower and other components forward of the aft sunscreen 68 are spinning.

Two scenarios have been devised to free the stuck ribs 72 of the high gain antenna. One of those scenarios and assisted equipment, depicted in FIGS. 7-8 will be employed if the antenna section can be despun. On the other hand, if the antenna remains spinning, the apparatus and methods depicted in FIGS. 9-10 will be employed.

Figure 7:
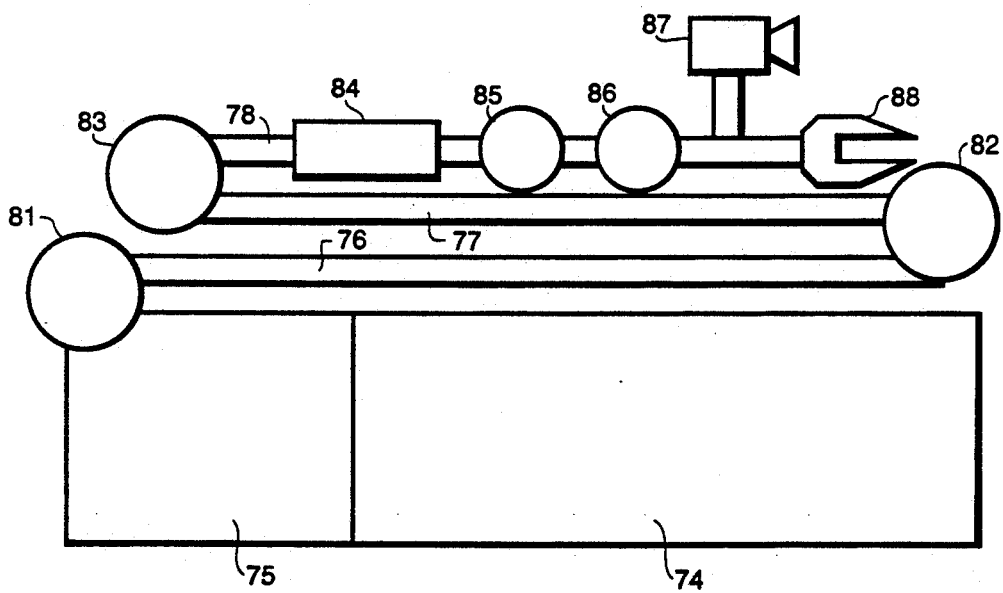
FIG. 7 illustrates one form of an Operational Service Vehicle embodying the principles of the present invention, designed especially for use in deploying the stuck rib of the Galileo antenna as depicted in FIG. 6.

FIG. 7 depicts an Operational Service Vehicle (OSV) generally indicated by reference numeral 73 consisting of service module 74 and a smart module 75. The smart module 75 is provided with a plurality of boom sections 76, 77 and 78 joined by locking joints 81, 82 and 83. The distal beam section 78 carries a linear actuator 84, fine motion joints 85 and 86, a television camera and ranging sensor 87 and a HGA rib gripper 88. In FIG. 7 those components are shown in the stowed position which are maintained until the OSV 73 is deployed from the MSV.

Figure 8:
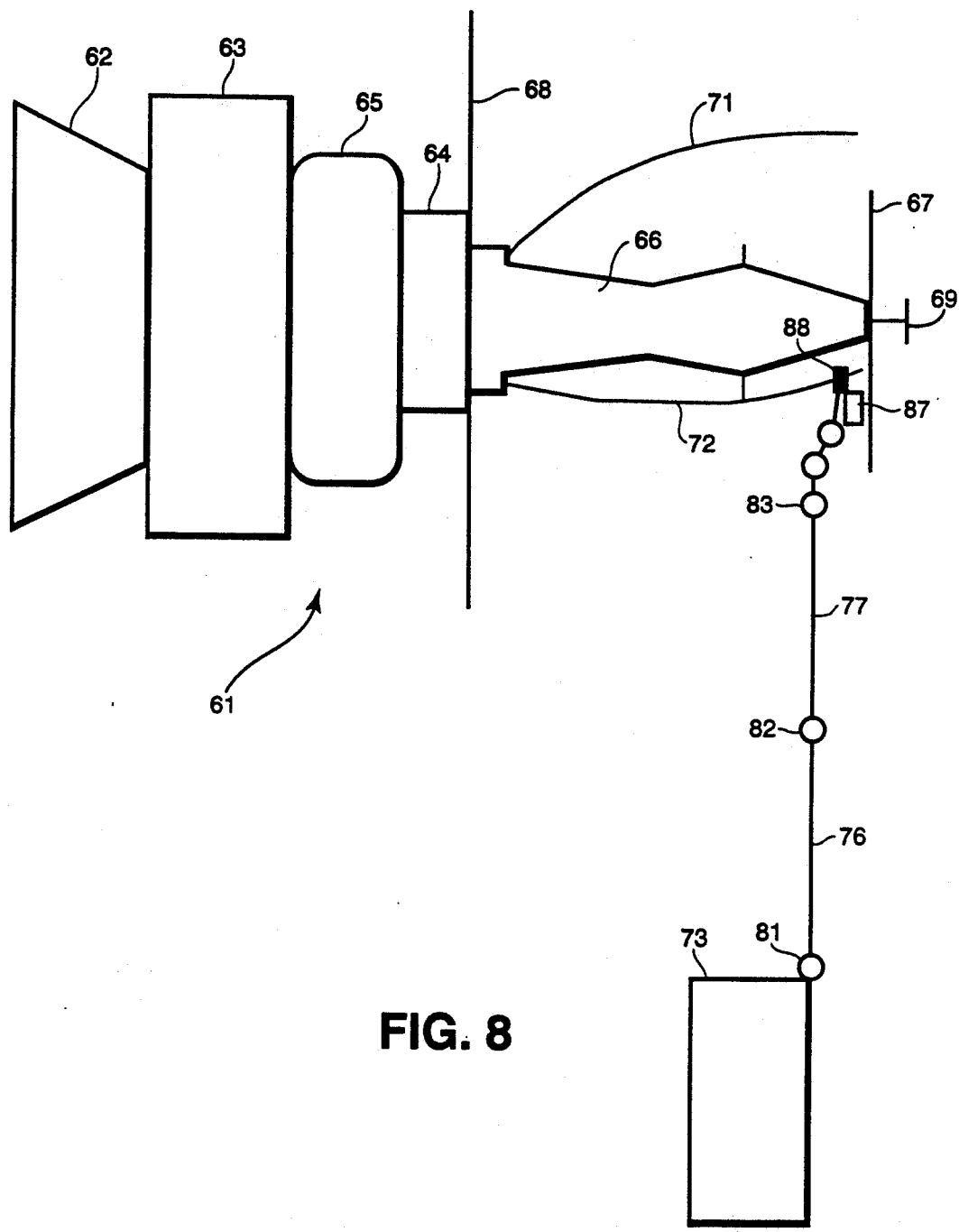
FIG. 8 depicts use of the OSV of FIG. 7 to deploy the stuck rib on the Galileo antenna.

As shown in FIG. 8, after such deployment the OSV is autonomously maneuvered to within a few meters of the spacecraft using control feedback behavior from the camera-ranging device 87. At a distance of about ten feet, the OSV opens the boom carrying the repair elements. When the tip of the repair elements are within four inches of the rib 72, the rib gripper is extended by the linear actuator 84 and the gripper 88 engages the stuck rib 72. Retracting force is then applied by the linear actuator 87, with additional force being applied by the OSV 73, until the rib 72 is freed. At this point the rib gripper 88 is released and the OSV 73 is maneuvered away from the spacecraft 71.

Figure 9:
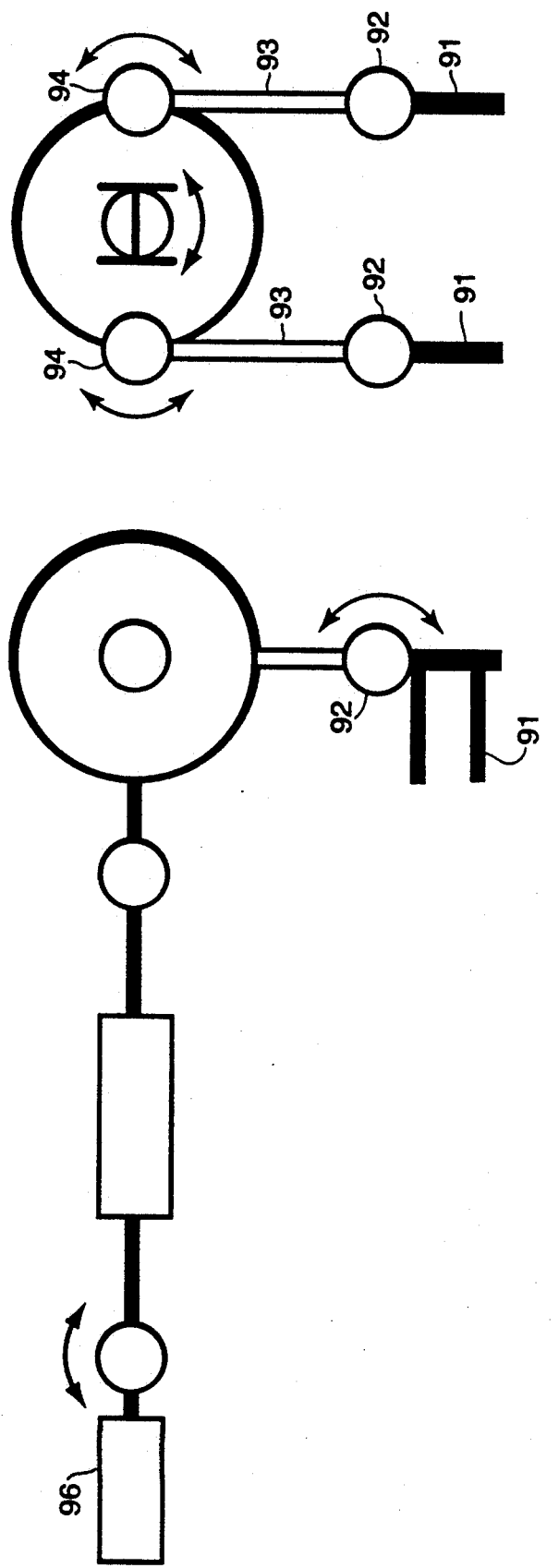
FIG. 9 depicts an alternate form of an OSV embodying the principles of the invention, for deploying the stuck rib of the Galileo antenna.
Figure 10:
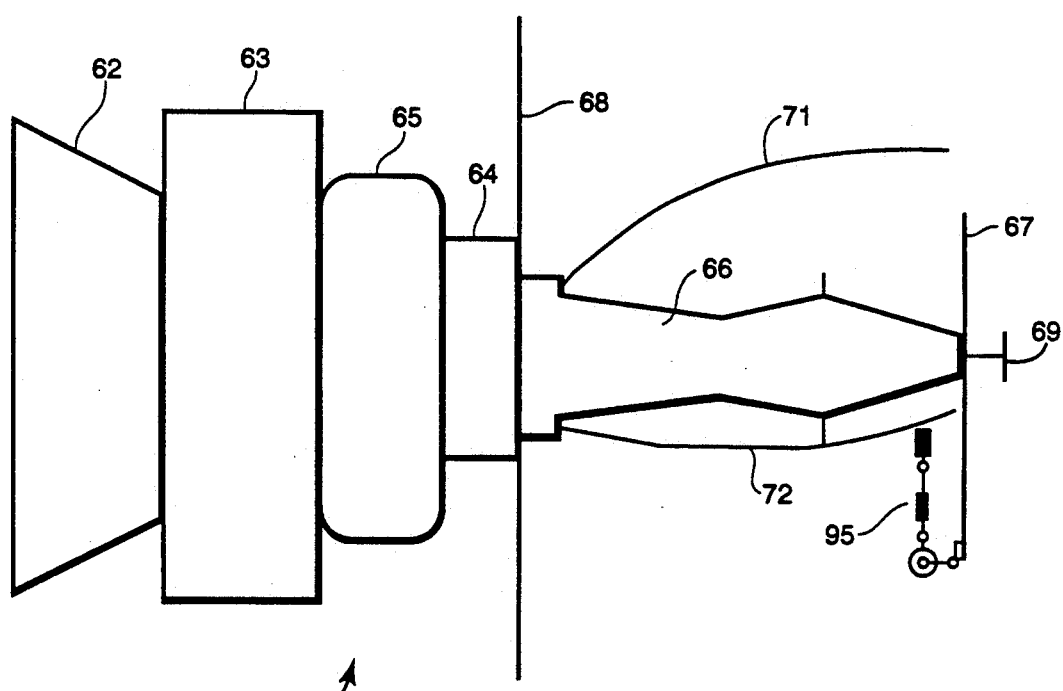
FIG. 10 depicts use of the alternative OSV of FIG. 9 to deploy the stuck rib of the Galileo antenna.

FIG. 9 depicts a robotic device devised in use for case th antenna section of the spacecraft 61 is spinning. The OSV carries the device of FIG. 9 to within a fraction of a meter of and precisely aligned with the front sunscreen 67. At this point the device of FIG. 9 is positioned so that the grippers 91 engage the front sunscreen 67. Rotation of the screen 76 dismounts the device of FIG. 9 from the OSV. By manipulation of the joints 94, arms 93 and grippers 91, the robot of FIG. 9 moves around the perimeter of the screen 67 until it reaches a point as shown in FIG. 10 directly over the stuck rib 72. The robot extends the manipulator arm 95 to enable the rib gripper 96 to grasp the rib 72. The robot of FIG. 9 then pulls the rib outwardly until it is free. The robot then releases the rib gripper 96 and the front sun sheet grippers 91, and is flung slowly away from spacecraft 61 by centrifugal force.

Having described my invention in such terms as to enable those skilled in the art to understand and practice it, and having disclosed the presently preferred embodiment thereof, I claim:

1. A system for in-space service of a spacecraft, said system comprising:
(A) an earth launch vehicle (ELV);
(B) an exoatmospheric mothership vehicle (MSV), adapted to (1) be carried into a first space trajectory by said ELV, (2) separate from said ELV, (3) transit to a second space trajectory higher than low earth orbit (LEO), and (4) station keep with said spacecraft;
(C) a plurality of Operational Service Vehicles (OSV), adapted to (1) be carried into said second higher space trajectory by said MSV, (2) separate from said MSV at said station keeping distance and (3) operatively approach said spacecraft, each said OSV including (a) propulsion means, and (b) spacecraft servicing means, and (c) behavior control artificial life computer means for autonomously controlling said propulsion means and said servicing means.

* * * * *